US012683303B2

(12) United States Patent
Chen

(10) Patent No.: US 12,683,303 B2
(45) Date of Patent: Jul. 14, 2026

(54) CONDUCTOR TERMINAL

(71) Applicant: XIAMEN GHGM INDUSTRIAL TRADE CO., LTD, Xiamen (CN)

(72) Inventor: Bingshui Chen, Xiamen (CN)

(73) Assignee: XIAMEN GHGM INDUSTRIAL TRADE CO., LTD, Xiamen (CN)

( * ) Notice: Subject to any disclaimer, the term of this patent is extended or adjusted under 35 U.S.C. 154(b) by 332 days.

(21) Appl. No.: 18/433,432

(22) Filed: Feb. 6, 2024

(65) Prior Publication Data

US 2025/0141126 A1 May 1, 2025

(30) Foreign Application Priority Data

Oct. 31, 2023 (CN) ......................... 202311433340.9

(51) Int. Cl.
*H01R 4/48* (2006.01)

(52) U.S. Cl.
CPC ......... *H01R 4/4833* (2023.08); *H01R 4/4821* (2023.08); *H01R 4/483* (2023.08); *H01R 4/4835* (2023.08); *H01R 4/484* (2023.08); *H01R 4/4846* (2023.08)

(58) Field of Classification Search
None
See application file for complete search history.

(56) References Cited

U.S. PATENT DOCUMENTS 9,437,940 B1 * 9/2016 Rao ...................... H01R 4/4821
9,466,895 B2 * 10/2016 Köllmann .............. H01R 4/483
10,236,597 B2 * 3/2019 Meyer .................... H01R 11/01
11,621,504 B2 * 4/2023 Moser .................... H01R 4/483
439/709
2015/0372402 A1 * 12/2015 Köllmann ............ H01R 4/4821
439/816

FOREIGN PATENT DOCUMENTS

DE 202013102204 U1 * 6/2013 ............. H01R 4/483
DE 202020102539 U1 * 8/2021 ........... H01R 4/4833

* cited by examiner

*Primary Examiner* — Tho D Ta

(57) ABSTRACT

A conductor terminal includes a rubber shell, control pieces, and clamping springs. A connecting section is formed in a height direction of each of the clamping springs. Each connecting section is connected between a highest position and a lowest position of each of the clamping springs. A total length of each connecting section is greater than a distance between the highest position and the lowest position of each of the clamping springs, making each connecting section more extended and disposed within the entire clamping spring. Moreover, the conductor terminal is flattened, which increases the size in the plug-in direction and significantly reduces the overall height, making the wiring connection more efficient and tighter. In this way, the conductor terminal is narrowed, and the conductor terminal product is made lighter and thinner.

10 Claims, 6 Drawing Sheets

CONDUCTOR TERMINAL

TECHNICAL FIELD

The present disclosure relates to a field of connection terminal technology, and in particular to a conductor terminal.

BACKGROUND

In a connection terminal, to insert a wire into a socket of the connection terminal simply and effortlessly, control pieces are disposed on a shell of the connection terminal. Each of the control pieces is operated in an operating direction to open a clamping portion of a corresponding clamping spring. By controlling one of the control pieces, the wire is claimed by or separated from the corresponding clamping spring. Thus, the wire is easily and effortlessly plugged into the socket, and the wire is connected to the corresponding clamping spring. Likewise, the one of the control pieces is operated to separate the wire from the connection terminal, so that the wire is easily withdrawn from the socket.

Currently, a user can manually switch the one of the control pieces to a desired position for plugging and unplugging the wire. In the prior art, each of the control pieces is pulled for control. Since each clamping spring disposed in the connection terminal includes the clamping portion that is openable, each clamping spring occupies a large space to clamp the wire, which makes it difficult to achieve a narrow and light design concept with the height dimensions of the existing clamping springs.

SUMMARY

In view of this, the present disclosure provides a conductor terminal to solve the above problems.

The present disclosure adopts the following solutions:

The present disclosure provides a conductor terminal including a rubber shell, control pieces, and clamping springs. The control pieces are disposed on the rubber shell and each of the control pieces is switchable between an open position and a closed position. The clamping springs are disposed in the rubber shell, and a clamping portion of each of the clamping springs opens after a corresponding control piece is switched to the open position from the closed position. A connecting section is formed in a height direction of each of the clamping springs, and each connecting section is configured to lower a height of each of the clamping springs. Each connecting section is connected between a highest position and a lowest position of each of the clamping springs. A total length of each connecting section is greater than a distance between the highest position and the lowest position of each of the clamping springs.

In one optional embodiment, a first end of each connecting section is connected to the highest position of each of the clamping springs to define a first connecting point, and a second end of each connecting section is connected to the lowest position of each of the clamping springs to define a second connecting point. Each first connecting point and a corresponding second connecting point are staggered along a horizontal direction.

In one optional embodiment, each connecting section is disposed in an L shape, and a height reduction range of each of the clamping springs is positively correlated with a transverse size of each connecting section.

In one optional embodiment, each connecting section is obliquely disposed, and a height reduction range of each of the clamping springs is a difference between the total length of each connecting section and the distance between the highest position and the lowest position of each of the clamping springs.

In one optional embodiment, each of the clamping springs includes a confluence piece and an elastic piece, and each confluence piece and a corresponding elastic piece are connected to form a corresponding clamping portion. Each elastic piece is C-shaped. An installing shaft is disposed in the rubber shell, and each elastic piece is sleeved on the installing shaft. An upper end of each elastic piece is capable of extending obliquely to elastically contact an upper end face of the corresponding confluence piece to form the corresponding clamping portion, and a lower end of each elastic piece extends horizontally to assemble and attach to a lower end face of the corresponding confluence piece.

In one optional embodiment, a lowest point of each elastic piece at the installing shaft is lower than the lower end face of the corresponding confluence piece, and the upper end of each elastic piece forms a maximum angle with the upper end face of the corresponding confluence piece.

In one optional embodiment, the lowest point of each elastic piece tends to coincide with a bottom wall of the rubber shell.

In one optional embodiment, the rubber shell includes a guide portion, and the guide portion is configured to guide each of the control pieces to move. The guide portion defines a moving path of each of the control pieces in a horizontal direction, so that each of the control pieces moves to be limited in the open position after being pushed horizontally.

In one optional embodiment, the guide portion is configured as a strip groove defined on the rubber shell. Guide protrusions are correspondingly disposed on each of the control pieces, and the guide protrusions of each of the control pieces are matched with the strip groove.

In one optional embodiment, the strip groove includes a first end and a second end. The first end of the strip groove is formed at a high position of the strip groove, and the second end of the strip groove is formed at a low position of the strip groove. The first end and the second end of the strip groove are communicated with each other. The first end of the strip groove is located at a head of a first half section, extended obliquely, of the strip groove; and the second end of the strip groove is located at a tail end of a second half section, extended horizontally, of the strip groove.

By adopting the above technical solutions, the present disclosure can achieve the following technical effects:

The conductor terminal of the present disclosure is provided with a connecting section on each of the clamping springs, and the connecting section is connected between the highest position and the lowest position of each of the clamping springs. By setting a total length of each connecting section to be greater than a length of the distance between the highest position and the lowest position of each of the clamping springs, each connecting section is further extended within each of the clamping springs. Moreover, the conductor terminal is flattened, which increases the size in the plug-in direction and significantly reduces the overall height, making the wiring connection more efficient and tighter. In this way, the conductor terminal is narrowed, and the conductor terminal product is made lighter and thinner.

1—rubber shell; 2—control piece; 3—clamping spring; 4—strip groove; 5—guide protrusion; 6—wrench-shaped body; 7—wing panel; 8—hook portion; 9—fitting portion; 10—confluence piece; 11—elastic piece; 12—control section; 13—installing shaft; 14—welding leg; 15—foolproof portion; 16—side wall; 17—connecting section.

DETAILED DESCRIPTION OF PREFERRED EMBODIMENTS

In order to make objectives, technical solutions, and advantages of the embodiments of the present disclosure clear, technical solutions in the embodiments of the present disclosure will be described clearly and completely in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. Therefore, following detailed description of the embodiments of the present disclosure provided in the accompanying drawings is not intended to limit the scope of the present disclosure, but merely represents selected embodiments of the present disclosure.

With reference to FIGS. 1 to 10, the embodiment provides a conductor terminal, which includes a rubber shell 1, control pieces 2, and clamping springs 3. The control pieces 2 are disposed on the rubber shell 1 and each of the control pieces 2 is switchable between an open position and a closed position. The clamping springs 3 are disposed in the rubber shell 1, and a clamping portion of each of the clamping springs 3 opens after a corresponding control piece 2 is switched to the open position from the closed position.

The rubber shell 1 includes a guide portion, and the guide portion is configured to guide each of the control pieces 2 to move. The guide portion defines a moving path of each of the control pieces 2 in a horizontal direction, so that each of the control pieces 2 moves to the open position and is smoothly limited to the open position after being pushed horizontally.

In the above embodiment, the rubber shell 1 includes the guide portion, and the guide portion defines the moving path of each of the control pieces 2 in the horizontal direction, which allows each of the control pieces 2 to be pushed horizontally to the open position after being operated by a user, thereby triggering the clamping portion of each of the clamping springs 3 to open. Therefore, there is no need to provide hinges for rotations of the control pieces 2 on the rubber shell 1, thereby simplifying an operation mode of the control pieces 2 on the conductor terminal. Further, the operation mode of the control pieces 2 is not limited to an external space environment, making the operation of the control pieces 2 more labor-saving and convenient.

Figure 1:
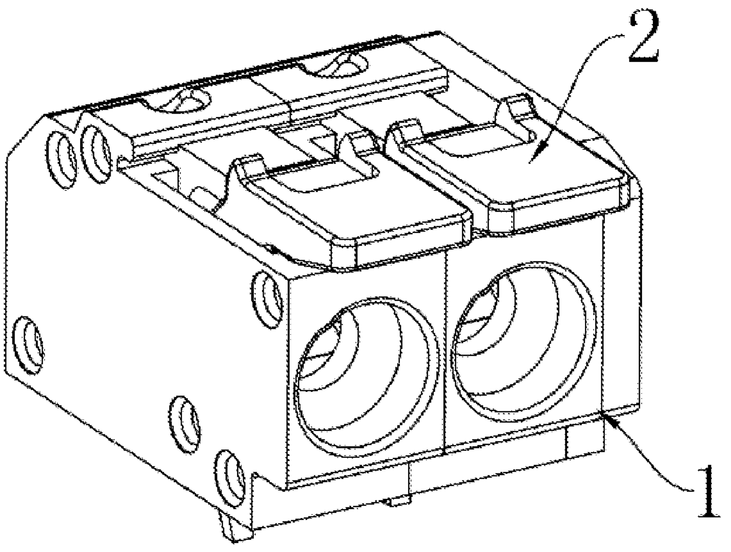
FIG. 1 is a schematic structural diagram of a conductor terminal according to one embodiment of the present disclosure shown in a first use position.
Figure 2:
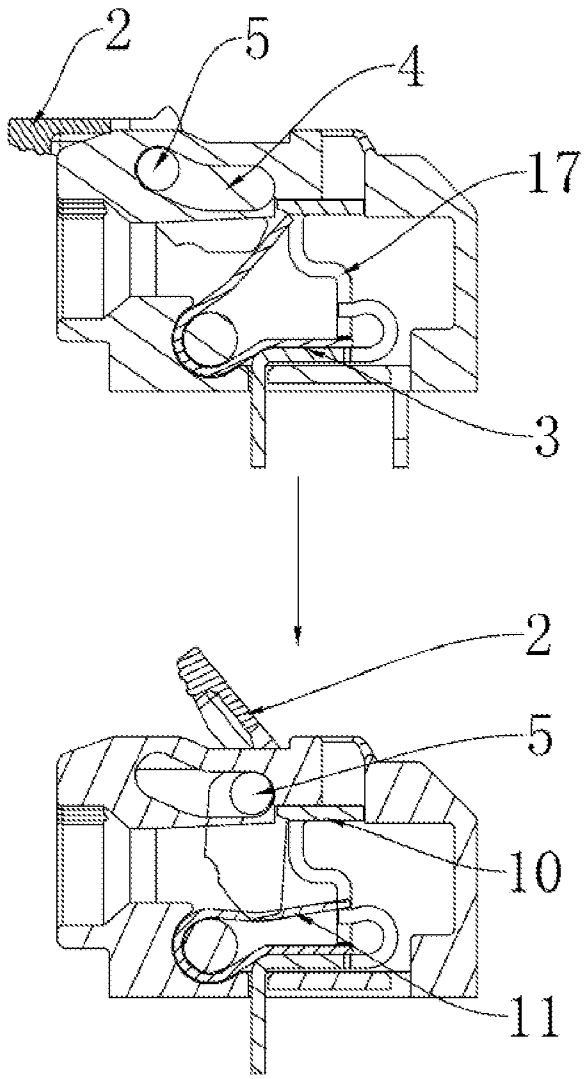
FIG. 2 is a cross-sectional view of the conductor terminal according to one embodiment of the present disclosure, where the control pieces are switched from a closed position to an open position.
Figure 3:
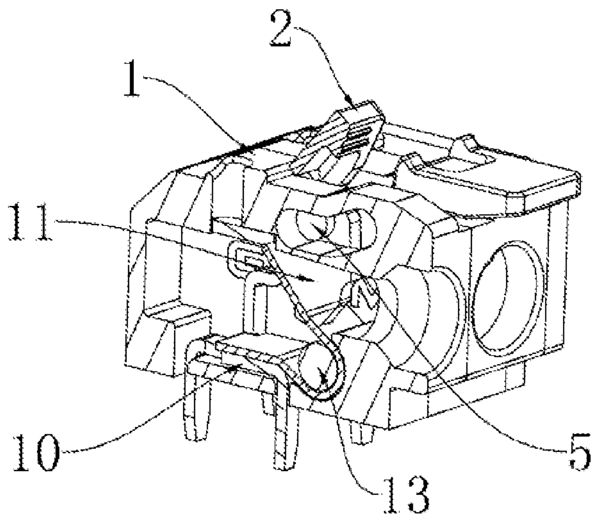
FIG. 3 is another cross-sectional view of the conductor terminal according to one embodiment of the present disclosure.
Figure 4:
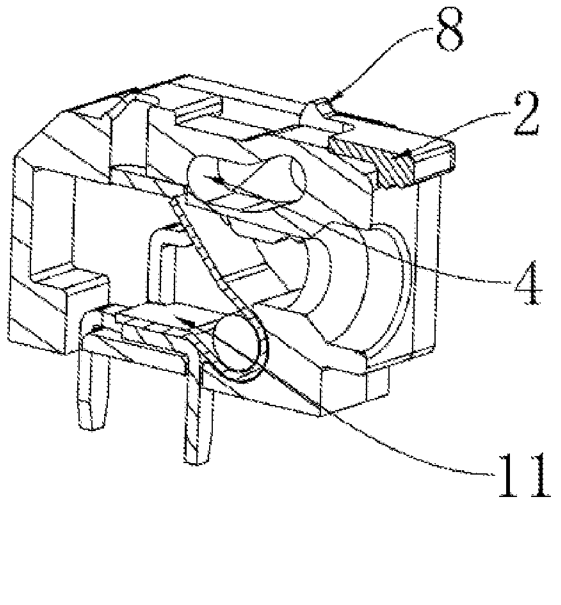
FIG. 4 is another cross-sectional view of the conductor terminal according to one embodiment of the present disclosure.

As shown in FIGS. 2 to 4, in the embodiment, the guide portion is configured as a strip groove 4 defined on the rubber shell 1; guide protrusions 5 are correspondingly disposed on each of the control pieces 2, and the guide protrusions 5 of each of the control pieces 2 are matched with the strip groove 4. Therefore, by sliding the guide protrusions 5 of each of the control pieces 2 in the strip groove 4, each of the control pieces 2 is capable of switching back and forth between the closed position and the open position.

Furthermore, the strip groove 4 includes a first end and a second end. The first end of the strip groove 4 is formed at a high position of the strip groove, and the second end of the strip groove 4 is formed at a low position of the strip groove. The first end of the strip groove 4 and the second end of the strip groove 4 are communicated with each other. The first end of the strip groove 4 is located at a head of a first half section, extended obliquely, of the strip groove 4, and the second end of the strip groove 4 is located at a tail end of a second half section, extended horizontally, of the strip groove 4. In the embodiment, when the guide protrusions 5 each of the control pieces 2 are limited to the first end at the high position of the strip groove 4, each of the control pieces 2 is correspondingly in the closed position, and each of the control pieces 2 is horizontally disposed relative to the rubber shell 1. When the guide protrusions 5 of each of the control pieces 2 are limited to the second end at the low position of the strip groove 4, each of the control pieces 2 is correspondingly in the open position, and an included angle is formed between each of the control pieces 2 and the rubber shell 1. The strip groove 4 defines the high position and low positions, which is conducive to relative movement of each of the control pieces 2 on the rubber shell 1 and occupies small space.

Specifically, due to an elastic force of each of the clamping springs 3, each of the control pieces 2 is always horizontally elastically supported in the closed position or obliquely elastically supported in the open position. Due to the elastic force of each of the clamping springs 3, each of the control pieces 2 is always maintained in the closed position or the open position, which ensures that when each of the control pieces 2 is operated, each of the control pieces 2 is capable of switching to the closed position with less effort while being prevented from being switched to the open position, thereby avoiding accidental touching.

After each of the control pieces 2 is opened, the included angle between each of the control pieces 2 and the rubber shell 1 is less than 30°. Since the strip groove is extended in a horizontal downward arc, each of the control pieces 2 is movable downward according to the moving path defined by the strip groove 4 after being pushed horizontally by the user. On the one hand, a pressing depth of each of the control pieces 2 on the corresponding clamping spring 3 is greatly promoted. On the other hand, each of the control pieces 2 tends to move downward, which is beneficial for each of the control pieces 2 to engage with the rubber shell 1 for a limited position thereof. Please refer to the description below for further details.

Figure 5:
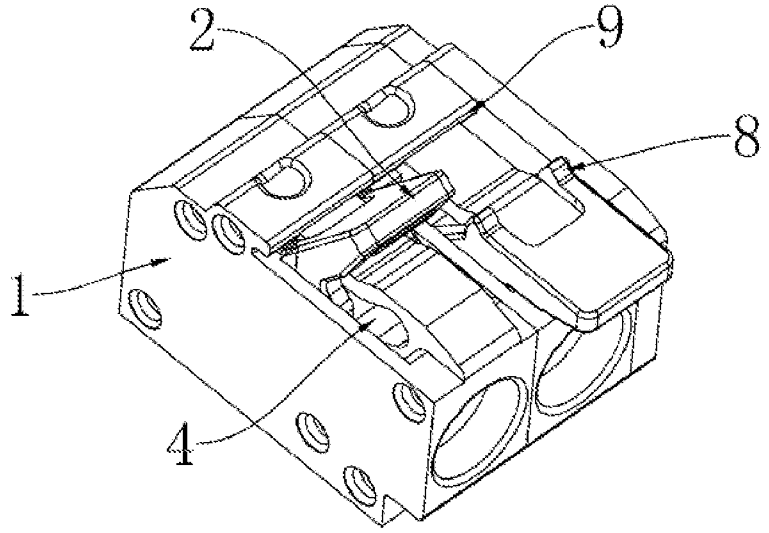
FIG. 5 is a schematic structural diagram of the conductor terminal according to one embodiment of the present disclosure shown in a second use position.
Figure 6:
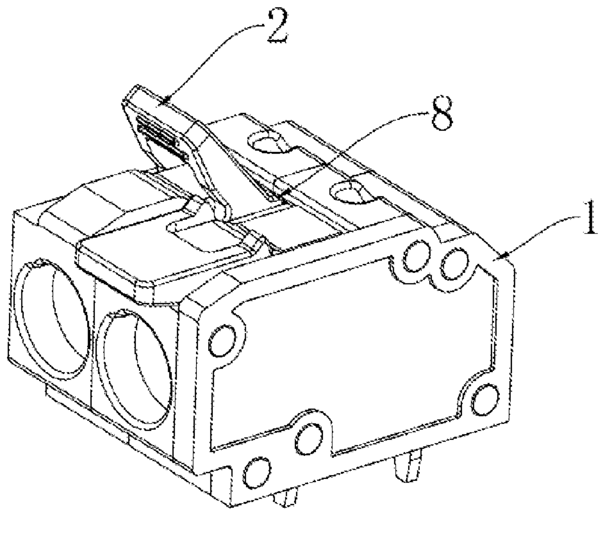
FIG. 6 is another schematic structural diagram of the conductor terminal according to one embodiment of the present disclosure.
Figure 7:
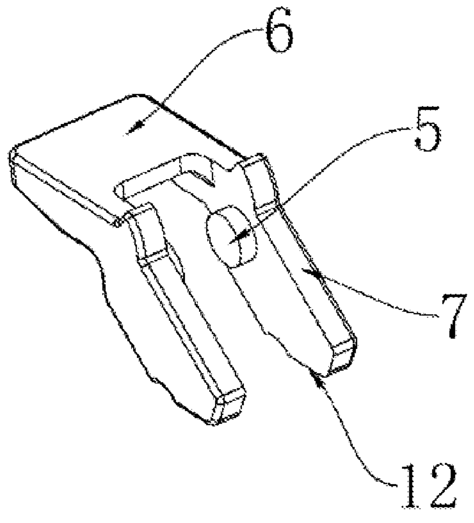
FIG. 7 is a schematic structural diagram of a control piece of the conductor terminal according to one embodiment of the present disclosure.

As shown in FIGS. 5 to 7, in the embodiment, each of the control pieces 2 includes a wrench-shaped body 6. The guide protrusions 5 thereof are relatively disposed on inner end surfaces of the two wing plates 7 of the wrench-shaped body 6. The guide protrusions 5 of each of the control pieces 2 slide in the strip grooves and contact with the strip groove 4. By such arrangement, each of the control pieces 2 is allowed to be closely and effectively disposed on the rubber shell 1, and a cooperation space between structural parts thereof is saved.

Each wrench-shaped body 6 includes hook portions 8, and the rubber shell 1 includes fitting portions 9 matched with the hook portions 8. When each of the control pieces 2 is switched to the open position, under the elastic force of the corresponding clamping spring 3, corresponding hook portions 8 are engaged with and abutted against a corresponding fitting portion 9. Specifically, each of the fitting portions 9 is configured as an engaging cavity formed on an end surface of the rubber shell 1. Each engaging cavity is defined behind each of the control pieces 2. After each of the control pieces 2 is moved and switched to the open position, the hook portions 8 of rib structures, on each of the control pieces 2 are just locked in the corresponding engaging cavity.

In the embodiment, each of the clamping springs 3 includes a confluence piece 10 and an elastic piece 11, and the confluence piece thereof and the elastic piece thereof are matched to form the clamping portion thereof. The wing plates 7 of each of the control pieces 2 include control sections 12, which are always in elastic contact with a corresponding elastic piece 11. The control sections 12 of each of the control pieces 2 are configured to control the opening or closing of the corresponding clamping portion.

Figure 8:
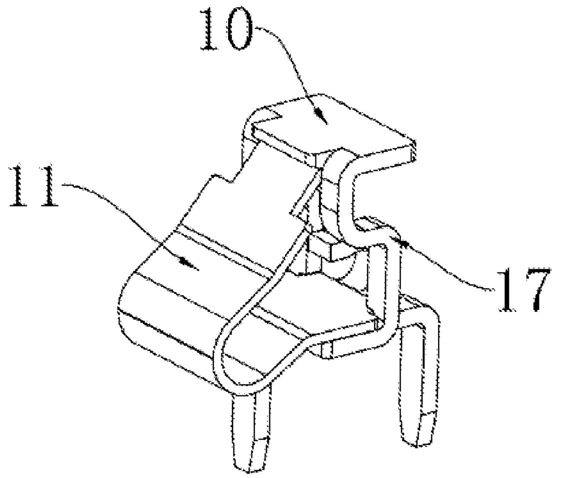
FIG. 8 is a schematic structural diagram of a clamping spring of the conductor terminal according to one embodiment of the present disclosure.
Figure 9:
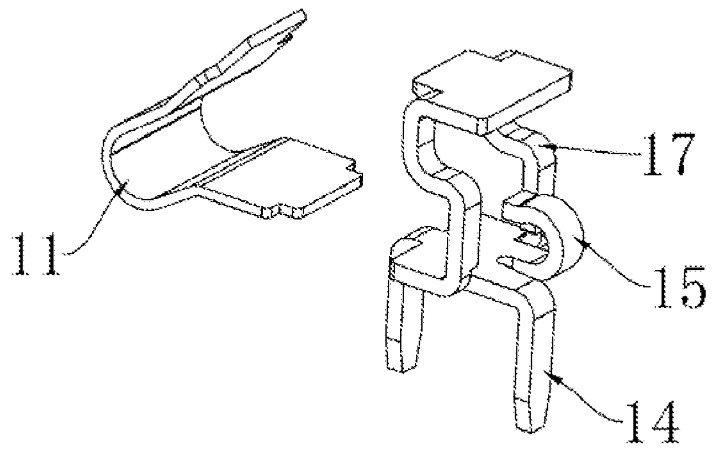
FIG. 9 is an exploded schematic diagram of the clamping spring shown in FIG. 8.

As shown in FIG. 8 and FIG. 9, in this embodiment, each elastic piece 11 is C-shaped; an installing shaft 13 is disposed in the rubber shell 1, and each elastic piece 11 is sleeved on the installing shaft 13. An upper end of each elastic piece 11 is capable of extending obliquely to elastically contact an upper end face of a corresponding confluence piece 10 to form the corresponding clamping portion, and a lower end of each elastic piece 11 extends horizontally to assemble and attach to a lower end face of the corresponding confluence piece 10. After each elastic piece 11 is installed and limited on the installing shaft 13, it is assembled with the corresponding confluence piece 10 disposed in the rubber shell 1 to achieve quick disassembly, assembly, and maintenance.

Welding pins 14 extend downward from a lower end surface of each confluence piece 10. The lower end surface of each confluence piece 10 is bent upward to form a foolproof portion 15. Each foolproof portion 15 is configured to contact and support an end of a corresponding elastic piece 11 after each clamping portion is opened. Obviously, the welding pins 14 pass through the rubber shell 1 to expose welding positions. Each foolproof portion 15 plays a role in supporting and protecting the corresponding elastic piece 11 to avoid failure of the elastic force and thereby increase service life of each of the clamping springs 3. It is noted that each foolproof portion 15 also plays a cascading role.

Figure 10:
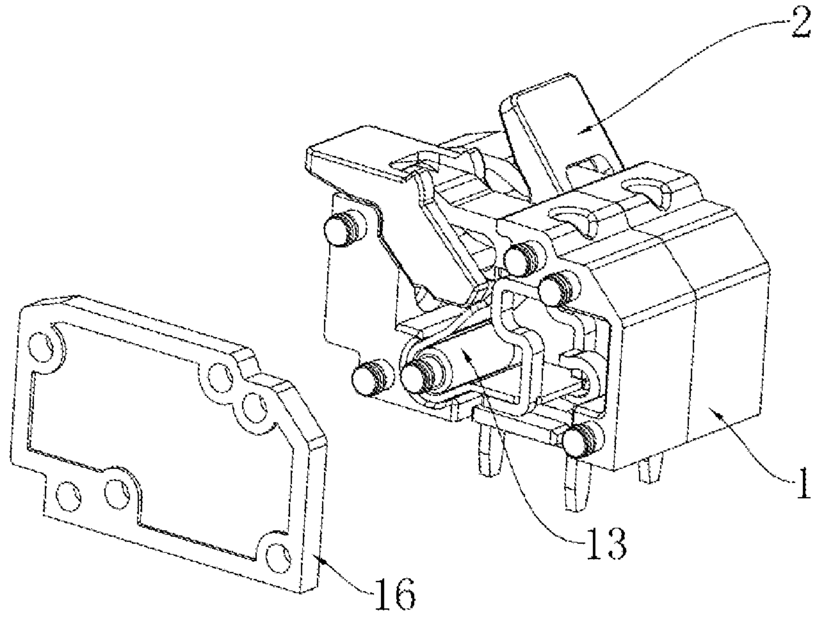
FIG. 10 is an exploded schematic diagram of the conductor terminal according to the embodiment of the present disclosure.

It should be mentioned that, as shown in FIG. 10, the conductor terminal includes at least two clamping springs 3 and at least two control pieces 2 for operating the clamping springs 3. The rubber shell 1 includes side walls 16, and the side walls 16 are detachable. The side walls 16 are inserted into the rubber shell so as to connect with the rubber shell 1. When the side walls 16 are detached, the clamping springs 3 are exposed, which is conducive to the inspection and maintenance of the conductor terminal.

As shown in FIG. 2, FIG. 8, and FIG. 9, in this embodiment, a connecting section 17 is formed in a height direction of each of the clamping springs 3, and the connecting section 17 thereof is configured to lower a height of each of the clamping springs 3. Each connecting section 17 is connected between a highest position and a lowest position of each of the clamping springs 3. A total length of each connecting section 17 is greater than a length of a distance between the highest position and the lowest position of each of the clamping springs 3.

In the above embodiment, each of the clamping springs 3 includes the connecting section 17, and the connecting section 17 thereof is connected between the highest position and the lowest position of each of the clamping springs. By setting the total length of each connecting section 17 to be greater than the distance between the highest position and the lowest position of each of the clamping springs, each connecting section 17 is further extended within each of the clamping springs 3. Moreover, the conductor terminal is flattened, which increases the size in the plug-in direction and significantly reduces the overall height, making the wiring connection more efficient and tighter. In this way, the conductor terminal is narrowed, and the conductor terminal is made lighter and thinner.

In this embodiment, a first end of each connecting section 17 is connected to the highest position of each of the clamping pieces to define a first connecting point, and a second end of each connecting section 17 is connected to the lowest position of each of the clamping pieces to define a second connecting point. Each first connecting point and a corresponding second connecting point are staggered along the horizontal direction. Therefore, each first connecting point above a corresponding clamping spring 3, of each connecting section and the corresponding second connecting point, below the corresponding clamping spring 3, of each connecting section are not in the same vertical plane and are staggered from each other. Therefore, each connecting section 17 is allowed to be flexibly connected and located between the highest position and the lowest position of the corresponding clamping spring 3, so that the total length of each connecting section is allowed to be larger. Thus, the highest point of each of the clamping springs is able to be lowered to a required height, thereby making the conductor terminal flat and narrow.

In one embodiment, each connecting section 17 is disposed in an L shape, and a height reduction range of each of the clamping springs is positively correlated with a transverse size of each connecting section 17. Specifically, each connecting section 17 that is L-shaped has longitudinal dimensions and a transverse dimension. A sum of the longitudinal dimensions is a predetermined height dimension of each of the clamping springs 3 (that is, the distance between the highest position and the lowest position of each of the clamping springs 3). A sum of the lateral dimensions is the reduced height dimension. The sum of the lateral dimensions is increased through multi-stage L-shaped bending, making an overall height of each of the clamping springs 3 small.

In another embodiment, the connecting section 17 is obliquely extended, and a height reduction range of each of the clamping springs 3 is a difference between the total length and a longitudinal length of each connecting section 17. Specifically, each connecting section 17 extends in an oblique straight line. A size of each connecting section 17 has a sinusoidal relationship with the predetermined height of each of the clamping springs 3. Moreover, by deducting the predetermined height of each of the clamping springs 3 from the total length of each connecting section 17, the height reduction range of each of the clamping springs 3 is obtained.

In the embodiment, a lowest point of each elastic piece 11 at the installing shaft 13 is lower than a lower end face of each confluence piece 10, so that an upper end of each elastic piece forms a maximum angle with an upper end face of a corresponding confluence piece 10.

The maximum angle is specifically achieved as follows. Each elastic piece 11 forms an included angle with the corresponding confluence piece 10 at the corresponding clamping portion, enabling the wire to be quickly plugged into the conductor terminal. The upper end of each elastic piece 11 extends diagonally to the upper end surface of the corresponding confluence piece 10 in a row structure, so that the included angle between each elastic piece 11 and the corresponding confluence piece 10 is stable. Moreover, since the height of each of the entire clamping springs 3 is reduced, a moving space between each elastic piece 11 and the corresponding confluence piece 10 is reduced, which makes the included angle of each clamping portion small, thus weakening a clamping force of each of the clamping springs 3.

Therefore, the lowest point of each elastic piece 11 tends to coincide with a bottom wall of the rubber shell 1. Therefore, an included angle formed by each elastic member 11 at the corresponding clamping portion is always greater than 45°.

The above are only optional embodiments of the present disclosure. The protection scope of the present disclosure is not limited to the above-mentioned embodiments. All technical solutions that fall under the idea of the present disclosure belong to the protection scope of the present disclosure.

What is claimed is:

1. A conductor terminal, comprising:

a rubber shell;

control pieces; and clamping springs;

wherein the control pieces are disposed on the rubber shell, and each of the control pieces is switchable between an open position and a closed position; the clamping springs are disposed in the rubber shell, and a clamping portion of each of the clamping springs opens after a corresponding control piece is switched to the open position from the closed position;

wherein a connecting section is formed in a height direction of each of the clamping springs, and each connecting section is configured to lower a height of the each of the clamping springs; each connecting section is connected between a highest position and a lowest position of each of the clamping springs; a total length of each connecting section is greater than a distance between the highest position and the lowest position of each of the clamping springs;

wherein each of the clamping springs comprises a confluence piece and an elastic piece, and each confluence piece and a corresponding elastic piece are connected to form a corresponding clamping portion; each elastic piece is C-shaped; an installing shaft is disposed in the rubber shell, and each elastic piece is sleeved on the installing shaft; an upper end of each elastic piece is capable of extending obliquely to elastically contact an upper end face of the corresponding confluence piece to form the corresponding clamping portion, and a lower end of each elastic piece extends horizontally to assemble and attach to a lower end face of the corresponding confluence piece.

2. The conductor terminal of claim 1, wherein a first end of each connecting section is connected to the highest position of each of the clamping springs to define a first connecting point, and a second end of each connecting section is connected to the lowest position of each of the clamping springs to define a second connecting point; each first connecting point and a corresponding second connecting point are staggered along a horizontal direction.

3. The conductor terminal of claim 2, wherein each connecting section is disposed in an L shape, and a height reduction range of each of the clamping springs is positively correlated with a transverse size of each connecting section.

4. The conductor terminal of claim 2, wherein each connecting section is obliquely disposed, and a height reduction range of each of the clamping springs is a difference between the total length of each connecting section and the distance between the highest position and the lowest position of each of the clamping springs.

5. The conductor terminal of claim 1, wherein a lowest point of each elastic piece at the installing shaft is lower than the lower end face of the corresponding confluence piece, and the upper end of each elastic piece forms a maximum angle with the upper end face of the corresponding confluence piece.

6. The conductor terminal of claim 5, wherein the lowest point of each elastic piece tends to coincide with a bottom wall of the rubber shell.

7. The conductor terminal of claim 1, wherein the rubber shell comprises a guide portion, and the guide portion is configured to guide each of the control pieces to move; the guide portion defines a moving path of each of the control pieces in a horizontal direction, so that each of the control pieces moves to be limited in the open position after being pushed horizontally.

8. The conductor terminal of claim 7, wherein the guide portion is configured as a strip groove defined on the rubber shell; guide protrusions are correspondingly disposed on each of the control pieces, and the guide protrusions of each of the control pieces are matched with the strip groove.

9. The conductor terminal of claim 8, wherein the strip groove comprises a first end and a second end; the first end of the strip groove is formed at a high position of the strip groove, and the second end of the strip groove is formed at a low position of the strip groove; the first end and the second end of the strip groove are communicated with each other the first end of the strip groove is located at a head of a first half section, extended obliquely, of the strip groove; and the second end of the strip groove is located at a tail end of a second half section, extended horizontally, of the strip groove.

10. A conductor terminal, comprising:

a rubber shell;

control pieces; and clamping springs;

wherein the control pieces are disposed on the rubber shell, and each of the control pieces is switchable between an open position and a closed position; the clamping springs are disposed in the rubber shell, and a clamping portion of each of the clamping springs opens after a corresponding control piece is switched to the open position from the closed position;

wherein a connecting section is formed in a height direction of each of the clamping springs, and each connecting section is configured to lower a height of the each of the clamping springs; each connecting section is connected between a highest position and a lowest position of each of the clamping springs; a total length of each connecting section is greater than a distance between the highest position and the lowest position of each of the clamping springs;

wherein the rubber shell comprises a guide portion, and the guide portion is configured to guide each of the control pieces to move; the guide portion defines a moving path of each of the control pieces in a horizontal direction, so that each of the control pieces moves to be limited in the open position after being pushed horizontally;

wherein the guide portion is configured as a strip groove defined on the rubber shell; guide protrusions are correspondingly disposed on each of the control pieces, and the guide protrusions of each of the control pieces are matched with the strip groove;

wherein the strip groove comprises a first end and a second end; the first end of the strip groove is formed at a high position of the strip groove, and the second end of the strip groove is formed at a low position of the strip groove; the first end and the second end of the strip groove are communicated with each other; the first end of the strip groove is located at a head of a first half section, extended obliquely, of the strip groove; and the second end of the strip groove is located at a tail end of a second half section, extended horizontally, of the strip groove.

* * * * *